United States Patent
Gilkey et al.

(10) Patent No.: US 9,730,462 B2
(45) Date of Patent: Aug. 15, 2017

(54) NUTRITIONAL COMPOSITIONS

(71) Applicants: John C. Gilkey, Tucson, AZ (US);
Cynthia Dowdall, Tucson, AZ (US);
Elton Clark, Tucson, AZ (US)

(72) Inventors: John C. Gilkey, Tucson, AZ (US);
Cynthia Dowdall, Tucson, AZ (US);
Elton Clark, Tucson, AZ (US)

( * ) Notice: Subject to any disclaimer, the term of this patent is extended or adjusted under 35 U.S.C. 154(b) by 0 days.

(21) Appl. No.: 14/054,569

(22) Filed: Oct. 15, 2013

(65) Prior Publication Data

US 2014/0044829 A1  Feb. 13, 2014

Related U.S. Application Data

(63) Continuation of application No. 13/601,005, filed on Aug. 31, 2012, now abandoned.

(60) Provisional application No. 61/530,339, filed on Sep. 1, 2011.

(51) Int. Cl.

| | | |
|---|---|---|
| A23L 1/29 | (2006.01) |
| A23F 3/14 | (2006.01) |
| A23L 2/39 | (2006.01) |
| A23L 2/52 | (2006.01) |
| A23L 2/68 | (2006.01) |
| A23F 3/16 | (2006.01) |
| A23L 29/25 | (2016.01) |
| A23L 33/105 | (2016.01) |
| A23L 33/16 | (2016.01) |
| A23L 33/175 | (2016.01) |

(52) U.S. Cl.
CPC ............. *A23F 3/14* (2013.01); *A23F 3/163* (2013.01); *A23L 2/39* (2013.01); *A23L 2/52* (2013.01); *A23L 2/68* (2013.01); *A23L 29/25* (2016.08); *A23L 33/105* (2016.08); *A23L 33/16* (2016.08); *A23L 33/175* (2016.08)

(58) Field of Classification Search
CPC ......... A23K 1/1758; A23L 1/296; A23L 2/38; A23L 2/266
USPC ........ 426/648, 656, 573, 601, 615, 590, 597
See application file for complete search history.

(56) References Cited

FOREIGN PATENT DOCUMENTS

WO  2009099628  *  8/2009

OTHER PUBLICATIONS

Selye H. 1985. The Nature of Stress. Basal Facts. 7(1):3-11, 1985.
Chrousos G.P. 2009. Stress and disorders of the stress system. http://www.nature.com/nrendo/journall/v5/n7/full/nrendo.2009.106.html (Accessed Jul. 10, 2011).
Schmidt U. Holsboer F. and Rein T. 2011. Epigenetic aspects of posttraumatic stress disorder. Disease Markers. 30:77-87.
Weaver IC. 2009. Epigenetic effects of glucocorticoids. Seminars in Fetal & Neonatal Medicine. 14(3):143-50.
Baccarelli A., Cassano PA., Litonjua A., Park SK., Suh H., Sparrow D., Vokonas P. and Schwartz J. 2008. Cardiac autonomic dysfunction: effects from particulate air pollution and protection by dietary methyl nutrients and metabolic polymorphisms. Circulation. 117(14):1802-9.
Murakami K., Mizoue T., Sasaki S., Ohta M., Sato M., Matsushita Y. and Mishima N. 2008. Dietary intake of folate, other B vitamins, and omega-3 polyunsaturated fatty acids in relation to depressive symptoms in Japanese adults. Nutrition. 24(2):140-7.
Sanchez-Villegas A., Doreste J., Schlatter J., Pia J., Bes-Rastrollo M. and Martinez-Gonzalez MA. 2009. Association between folate, vitamin B(6) and vitamin B(12) intake and depression in the SUN cohort study. Journal of Human Nutrition & Dietetics. 22(2):122-33.
Depeint F., Bruce WR., Shangari N., Mehta R. and O'Brien PJ. 2006. Mitochondrial function and toxicity: role of the B vitamin family on mitochondrial energy metabolism. Chemico-BiologicalInteractions. 163(1-2):94-112.
Stiefel P., Arguelles S., Garcia S., Jimenez L, Aparicio R., Carneado J., Machado A. and Ayala A. 2005. Effects of short-term supplementation with folic acid on different oxidative stress parameters in patients with hypertension. Biochimica et Biophysics Acta. 1726(2):152-9.
Anyanwu EC., Ehiri JE. and Kanu I. 2005. Biochemical evaluation of antioxidant function after a controlled optimum physical exercise among adolescents. International Journal of Adolescent Medicine & Health. 17(1):57-66.
Lorenz M., Urban J., Engelhardt U., Baumann G., Stangl K. and Stangl V. 2009. Green and black tea are equally potent stimuli of NO production and vasodilation: new insights into tea ingredients involved. Basic Research in Cardiology. 104(1):100-10.
Steptoe A., Gibson EL., Vuononvirta R., Williams ED., Hamer M., Rycroft JA., Erusalimsky JD. and Wardle J. 2007. The effects of tea on psychophysiological stress responsivity and post-stress recovery: a randomised double-blind trial. Psychopharmacology. 190(1):81-9.
Mamus RT.. Dos Santos MG., Campbell B. and Kreider R. 2006. Biochemical effects of carbohydrate supplementation in a simulated competition of short terrestrial duathlon. Journal of the International Society of Sports Nutrition. 3:6-11.
McAnulty S., McAnulty L., Nieman D., Morrow J. and Dumke C. Utter A. 2007. Carbohydrate effect: hormone and oxidative changes. International Journal of Sports Medicine. 28(11):921-7.
Utter AC., Kang J., Nieman DC., Dumke CL., McAnulty SR. and McAnulty LS. 2007. Carbohydrate attenuates perceived exertion during intermittent exercise and recovery. Medicine & Science in Sports & Exercise. 39(5):880-5.
Morgan CA 3rd., Hazlett G., Southwick S., Rasmusson A. and Lieberman HR. 2009. Effect of carbohydrate administration on recovery from stress-induced deficits in cognitive function: a double-blind, placebo-controlled study of soldiers exposed to survival school stress. Military Medicine. 17 4(2): 132-8.
Sugino T., Aoyagi S., Shirai T., Kajimoto Y. and Kajimoto 0. 2007. Effects of Citric Acid and 1-Carnitine on Physical Fatigue. Journal of Clinical Biochemistry & Nutrition. 41 (3):224-30.

(Continued)

*Primary Examiner* — Helen F Heggestad
(74) *Attorney, Agent, or Firm* — Quarles & Brady LLP; Gavin J. Milczarek-Desai

(57) ABSTRACT

Nutritional compositions for general stress reduction and recovery from stress containing certain amounts of five key ingredients: creatine, freeze-dried ("instant") black tea, L-carnitine, lemon balm (*Melissa officinalis*) essential oil, and passionflower (*Passiflora incarnata*) essential oil.

1 Claim, No Drawings

(56) References Cited

OTHER PUBLICATIONS

McMorris T., Harris RC., Swain J., Corbett J., Collard K., Dyson RJ., Dye L., Hodgson C. and Draper N. 2006. Effect of creatine supplementation and sleep deprivation, with mild exercise, on cognitive and psychomotor performance, mood state, and plasma concentrations of catecholamine& and cortisol. Psychopharmacology. 185(1):93-103.

McMorris T., Harris RC., Howard AN., Langridge G., Hall B., Corbett J., Dicks M. and Hodgson C. 2007. Creatine supplementation, sleep deprivation, cortisol, melatonin and behavior. Physiology & Behavior. 90(1):21-8.

Burke DG., Candow DG., Chilibeck PD., MacNeil LG., Roy BD., Tarnopolsky MA. and Ziegenfuss T. 2008. Effect of creatine supplementation and resistance-exercise training on muscle insulin-like growth factor in young adults. International Journal of Sport Nutrition & Exercise Metabolism. 18(4):389-98, Aug. 2008.

Chilibeck PD., Magnus C. and Anderson M. 2007. Effect of in-season creatine supplementation on body composition and performance in rugby union football players. Applied Physiology, Nutrition, & Metabolism = Physiologie Appliquee, Nutrition et Metabolisme. 32(6):1052-7.

Hoffman JR., Stout JR., Falvo MJ .• Kang J. and Ratamess NA. 2005. Effect of low-dose, short-duration creatine supplementation on anaerobic exercise performance. Journal of Strength & Conditioning Research. 19(2):260-4.

Okudan N. and Gokbel H. 2005. The effects of creatine supplementation on performance during the repeated bouts of supramaximal exercise. Journal of Sports Medicine & Physical Fitness. 45(4):507-11.

Wright GA., Grandjean PW. and Pascoe DD. The effects of creatine loading on thermoregulation and intermittent sprint exercise performance in a hot humid environment. Journal of Strength & Conditioning Research. 21(3):655-60, 2007.

Eckerson JM., Stout JR., Moore GA., Stone NJ., Nishimura K. and Tamura K. 2004. Effect of two and five days of creatine loading on anaerobic working capacity in women. Journal of Strength & Conditioning Research. 18(1): 168-73.

Kilduff LP., Georgiades E., James N., Minnion RH., Mitchell M., Kingsmore D., Hadjicharlambous M. and Pitsiladis YP. 2004. The effects of creatine supplementation on cardiovascular, metabolic, and thermoregulatory responses during exercise in the heat in endurance-trained humans. International Journal of Sport Nutrition & Exercise Metabolism. 14(4):443-60.

Pauly DF. and Pepine CJ. 2000. D-Ribose as a supplement for cardiac energy metabolism. Journal of Cardiovascular Pharmacology & Therapeutics. 5(4):249-58.

Eby G. and Halcomb WW. 2006. Elimination of cardiac arrhythmias using oral taurine with I-arginine with case histories: Hypothesis for nitric oxide stabilization of the sinus node. Medical Hypotheses. 67(5):1200-4.

Chowdhary S., Nuttall SL, Coote JH. and Townend JN. 2002. L-arginine augments cardiac vagal control in healthy human subjects. Hypertension. 39(1):51-6.

West SG., Ukos-Krick A., Brown P. and Mariotti F. 2005. Oral L-arginine improves hemodynamic responses to stress and reduces plasma homocysteine in hypercholesterolemic men. Journal of Nutrition. 135(2):212-7.

Smriga M., Ando T., Akutsu M., Furukawa Y., Miwa K. and Morinaga Y. 2007. Oral treatment with L-lysine and L-arginine reduces anxiety and basal cortisol levels in healthy humans. Biomedical Research. 28(2):85-90.

Ferrari R., Merli E., Cicchitelli G., Mele D., Fucili A. and Ceconi C. 2004. Therapeutic effects of L-carnitine and D propionyi-L-carnitine on cardiovascular diseases: a review. Annals of the New York Academy of Sciences. 1033:79-91.

Karlic H. and Lohninger A. 2004. Supplementation of L-carnitine in athletes: does it make sense? Nutrition. 20(7-8):709-15, Jul.-Aug. 2004.

Corchs F., Nutt DJ., HoodS. and Bemik M. 2009. Serotonin and sensitivity to trauma-related exposure in selective serotonin reuptake inhibitors-recovered posttraumatic stress disorder. Biological Psychiatry. 66(1):17-24.

Richell RA., Deakin JF. and Anderson IM. 2005. Effect of acute tryptophan depletion on the response to controllable and uncontrollable noise stress. Biological Psychiatry. 57(3):295-300.

Deijen JB., Wientjes CJ., Vullinghs HF.,Cloin PA. and Langefeld JJ. 1999. Tyrosine improves cognitive performance and reduces blood pressure in cadets after one week of a combat training course. Brain Research Bulletin. 48(2):203-9.

Kennedy DO., Little W. and Scholey AB. 2004. Attenuation of laboratory-induced stress in humans after acute administration of *Melissa officinalis* (Lemon Balm). Psychosomatic Medicine. 66(4):607-13.

Sawka, MN., Louise M.Burke LM., E. Randy Eichner ER., Maughan RJ, Scott J. Montain SJ. and Stachenfeld NS. 2007. Exercise and Fluid Replacement. Medicine and Science in Sports and Exercise. 39:377-390.

Movafegh A., Alizadeh R., Hajimohamadi F., Esfehani F. and Nejatfar M. 2008. Preoperative oral Passiflora incarnata 39 reduces anxiety in ambulatory surgery patients: a double-blind, placebo-controlled study. Anesthesia & Analgesia. 106 (6):1728-32.

Akhondzadeh S., Naghavi HR., Vazirian M., Shayeganpour A., Rashidi H. and Khani M. 2001. Passionflower in the treatment of generalized anxiety: a pilot double-blind randomized controlled trial with oxazepam. Journal of Clinical Pharmacy & Therapeutics. 26(5):363-7.

Satoh H. Kang J. 2009. Modulation by taurine of human arterial stiffness and wave reflection. Advances in Experimental Medicine & Biology. 643: 47-55.

Hua HM. Ito T. Qiu ZG. Azuma J. 2005. [Progress in research on function and mechanism of cardiac vascular system of taurine.] [Chinese] China Journal of Chinese Materia Medica. 30(9):653-8.

Fujita F., Dreyer H.C., Drummond M.J., Glynn E.L., Elena Volpi E. and Rasmussen B.B. 2009. Essential amino acid and carbohydrate ingestion before resistance exercise does not enhance postexercise muscle protein synthesis. Journal of Applied Physiolology. 106:1730-1739.

\* cited by examiner

NUTRITIONAL COMPOSITIONS

CROSS-REFERENCE TO RELATED APPLICATIONS

This application is a continuation of U.S. patent application Ser. No. 13/601,005, filed on Aug. 31, 2012, which claims priority to U.S. Provisional Application No. 61/530,339, filed on Sep. 1, 2011, all of which are incorporated herein by reference.

BACKGROUND OF THE INVENTION

Field of the Invention

The invention relates to nutritional compositions that can assist a user with one or more of maintaining cardiovascular health, reducing the stress response by mitigating the response of the cardiovascular and endocrine systems to stress, improving physical performance, speeding recovery from exertion, restoring and maintaining electrolyte balance, promoting calm, and enhancing cognitive functioning.

Background

Firefighters, police officers, military personnel and athletes are often under stress, sometimes encountering several stressful experiences every day. The work of Hans Selye[1] and others[2,3] shows that chronic stress, if unmitigated, can result in a chronic hyperaroused state that leads to the deleterious effects of stress through an epigenetic mechanism. The science of epigenetics studies the effects of environmental factors, including an individual's cognitive responses to the environment and their associated physiological effects, on the pattern of gene expression in the body. These effects on gene expression, which directly affect one's physical and mental well-being, are produced in part through methylation of DNA, which is reversible[4].

[1] Selye H. 1985. The Nature of Stress. Basal Facts. 7(1):3-11
[2] Chrousos G. P. 2009. Stress and disorders of the stress system. http://www.nature.com/nrendo/journal/v5/n7/full/nrendo.2009.106.html (Accessed Jul. 10, 2011)
[3] Schmidt U. Holsboer F. and Rein T. 2011. Epigenetic aspects of posttraumatic stress disorder. Disease Markers. 30:77-87
[4] Weaver I C. 2009. Epigenetic effects of glucocorticoids. Seminars In Fetal & Neonatal Medicine. 14(3):143-50

Unmitigated stress can cause epigenetic alterations of gene expression, leading to the deleterious long-term physiological and cognitive effects of stress.

Many nutritional compositions have been created to try to optimize energy production, rehydration, and endurance. However, finding compositions that are desirable and optimal for consumption during prolonged exercise and/or exposure to stress has proven elusive.

SUMMARY OF THE INVENTION

One aspect of the invention relates to a set of beverages, and the syrup and powder from which they may be produced, that are intended to be consumed for physical and cognitive/mental preparation ("Code 2" type formulations); while on scene, during exercise, during competition, or other sustained physical exertion ("Code 3" type formulations); and for recovery between scenes/calls/exercise or competitive sessions ("Code 4" type formulations), and that are designed to reduce the physiological effects of stress.

The nutritional compositions described herein contain certain amounts of five key ingredients: creatine, freeze-dried ("instant") black tea, L-carnitine, lemon balm (*Melissa officinalis*) essential oil, and passionflower (*Passiflora incarnata*) essential oil, as well as other ingredients, such as the stabilizer gum acacia, depending on the embodiment.

Still further aspects of the invention are detailed below.

DETAILED DESCRIPTION OF THE INVENTION

Compositions described herein are formulated to be antistressors and destressors, to promote optimal cognitive performance, and to restore and maintain normal homeostasis. Furthermore, some components of the nutritional compositions herein described should help keep the body and mind prepared for, improve their performance during, and accelerate their recovery from prolonged physical exertion and/or stress.

While the examples below relate to dry compositions (e.g., powders) and liquid beverage formulations, where powders are mixed with water or another aqueous medium, other embodiments for the nutritional compositions described herein could include energy bars where a binder is included and is in the form of chocolate, oats, wheat, peanut butter, semi-dried fruits, grains and combinations thereof. Moreover, a gel composition may be utilized, where the dry power composition is mixed with a viscous liquid "gel base" (such as a syrup) until a gel consistency is formed.

Although the invention has been described with reference to various compositions, it will be appreciated that various changes and modifications may be made without departing from the invention. The examples below are provided to better illustrate the invention and are not intended to limit the scope of the invention.

Non-Limiting Examples

A nutritional composition, termed "Code 2a," for reducing stress and certain other benefits, is created by mixing creatine, freeze-dried ("instant") black tea, L-carnitine, gum acacia, lemon balm (*Melissa officinalis*) essential oil, passionflower (*Passiflora incarnata*) essential oil, and taurine; with the total osmolarity of the final beverage (if in liquid form) not exceeding that of human blood plasma. In one embodiment, Code 2a includes in parts by weight, based on a total of 430-4300 parts by weight of the dry substance: creatine 150-1500; freeze-dried ("instant") black tea 50-500; gum acacia 10-100; L-carnitine 100-1000; lemon balm (*Melissa officinalis*) essential oil, 10-100; passionflower (*Passiflora incarnata*) essential oil 10-100; and taurine 100-1000 parts.

By way of example, a beverage can be created in which 400 mg taurine is dissolved in 300 ml distilled water and brought to 355 ml. Disperse 100 mg of the gum acacia in this solution by vigorous stirring at high shear for a period of 3 minutes. Add 50 μl each of the lemon balm and passionflower essential oils over the course of 30 seconds with vigorous stirring at high shear to create an emulsion, followed by another 3 minutes of vigorous stirring of the emulsion at high shear. Homogenize solution for 5 minutes in a microfluidizer. Next, 1.2 g creatine, 210 mg freeze-dried ("instant") black tea, and 400 mg L-carnitine are introduced into the solution with gentle shaking immediately before the beverage is consumed, thus preserving the efficacy of the creatine and tea.

A nutritional composition, termed "Code 2b," has been created with creatine, freeze-dried ("instant") black tea, gum acacia, L-carnitine, lemon balm (*Melissa officinalis*) essential oil, passionflower (*Passiflora incarnata*) essential oil, taurine, L-arginine and L-lysine; with the total osmolarity of the final beverage (if in liquid form) not exceeding that of human blood plasma. In one embodiment, the L-arginine and L-lysine components are included in a weight ratio of 1:1. By way of example, the composition includes, in parts by weight based on a total of 630-6300 parts by weight of the dry substance, of: creatine, 150-1500; freeze-dried ("instant") black tea, 50-500; gum acacia, 10-100; L-carnitine, 100-1000; lemon balm (*Melissa officinalis*) essential oil, 10-100; passionflower (*Passiflora incarnata*) essential oil, 10-100; taurine, 100-1000; L-arginine, 100-1000; and L-lysine, 100-1000.

A beverage may be made in which 400 mg taurine, 600 mg L-arginine and 600 mg L-lysine are dissolved in 300 ml distilled water and brought to 355 ml. Disperse 100 mg of the gum acacia in this solution by vigorous stirring at high shear for a period of 3 minutes. Add 50 µl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 1.2 creatine, 210 mg freeze-dried ("instant") black tea and 400 mg L-carnitine are introduced into the solution with gentle shaking immediately before the beverage is consumed, thus preserving the efficacy of the creatine and tea.

A nutritional composition, termed "Code 2c," has been created that includes creatine, freeze-dried ("instant") black tea, gum acacia, L-carnitine, lemon balm (*Melissa officinalis*) essential oil, passionflower (*Passiflora incarnata*) essential oil, taurine, L-arginine, L-lysine, L-tyrosine and L-tryptophan; with the total osmolarity of the final beverage (if in liquid form) not exceeding that of human blood plasma. Preferably, the L-arginine and L-lysine components are in a weight ratio of 1:1.

In one embodiment, and based on a total of 670-7600 parts by weight of the dry substance, the composition includes creatine, 150-1500; freeze-dried ("instant") black tea, 50-500; gum acacia, 10-100, L-carnitine, 100-1000; lemon balm (*Melissa officinalis*) essential oil, 10-100; passionflower (*Passiflora incarnata*) essential oil, 10-100; taurine, 100-1000; L-arginine, 100-1000; L-lysine, 100-1000; L-tyrosine, 30-300; and L-tryptophan, 10-1000.

A beverage may be made in which 400 mg taurine, 600 mg L-arginine, 600 mg L-lysine, 200 mg L-tyrosine and 100 mg L-tryptophan are dissolved in 300 ml distilled water and brought to 355 ml. Disperse 100 mg of the gum acacia in this solution by vigorous stirring at high shear for a period of 3 minutes. Add 50 µl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 1.2 g creatine, 210 mg freeze-dried ("instant") black tea and 400 mg L-carnitine are introduced into the solution with gentle shaking immediately before the beverage is consumed, thus preserving the efficacy of the creatine and tea.

A composition, termed "Code 2d," has been created with creatine, freeze-dried ("instant") black tea, gum acacia, L-carnitine, lemon balm (*Melissa officinalis*) essential oil, passionflower (*Passiflora incarnata*) essential oil, taurine, L-arginine, L-lysine, L-tyrosine, L-tryptophan, citric acid and D-ribose; with the total osmolarity of the final beverage (if in liquid form) not exceeding that of human blood plasma. The composition, in one embodiment, includes in parts by weight, based on a total of 830-9200 parts by weight of the dry substance, creatine, 150-1500; freeze-dried ("instant") black tea, 50-500; gum acacia 10-100; L-carnitine, 100-1000; lemon balm (*Melissa officinalis*) essential oil, 10-100; passionflower (*Passiflora incarnata*) essential oil, 10-100; taurine, 100-1000; L-arginine, 100-1000; L-lysine, 100-1000; L-tyrosine, 30-300; L-tryptophan, 10-1000; citric acid, 60-600; and D-ribose 100-1000.

A beverage may be made in which 400 mg taurine, 600 mg L-arginine, 600 mg L-lysine, 200 mg L-tyrosine 100 mg L-tryptophan, 540 mg citric acid and 800 mg D-ribose are dissolved in 300 ml distilled water and brought to 355 ml. Disperse 100 mg of the gum acacia in this solution by vigorous stirring at high shear for a period of 3 minutes. Add 50 µl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 1.2 g creatine, 210 mg freeze-dried ("instant") black tea and 400 mg L-carnitine are introduced into the solution with gentle shaking immediately before the beverage is consumed, thus preserving the efficacy of said creatine and tea.

A nutritional composition, termed "Code 2e," has been created with freeze-dried ("instant") black tea, calcium chloride, calcium pantothenate, biotin, citric acid, creatine, cyanocobolamine, D-ribose, folic acid, gum acacia, green tea extract, low DE maltodextrin, L-arginine, L-carnitine, L-histidine, L-isoleucine, L-leucine, L-lysine, L-methionine, L-phenylalanine, L-threonine, L-tryptophan, L-tyrosine, L-valine, lemon balm (*Melissa officinalis*) essential oil, magnesium chloride, nicotinic acid, passionflower (*Passiflora incarnata*) essential oil, potassium chloride, pyridoxal HCL, riboflavin, sodium chloride, taurine, and thiamin; with the total osmolarity of the final beverage (if in liquid form) not exceeding that of human blood plasma. Preferably, the L-histidine, L-isoleucine, L-leucine, L-lysine, L-methionine, L-phenylalanine, L-threonine, and L-valine are comprised in a weight ratio of 1:1:1:4.375:1.5:0.375:1:1.25.

In one embodiment, the composition contains, in parts by weight based on a total of 2,354-24,841 parts by weight of the dry substance, calcium chloride, 100-1000; calcium pantothenate, 0.1-1; biotin, 0.0006-0.06; citric acid, 60-600; creatine, 150-1500; cyanocobalamin, 0.001-0.1; D-ribose, 100-1000; freeze-dried ("instant") black tea, 50-500; folic acid, 0.01-0.1; gum acacia, 10-100; low DE maltodextrin 500-5000; L-arginine, 100-1000; L-carnitine, 100-1000; L-histidine 100-1000; L-isoleucine, 100-1000; L-leucine, 200-2000; L-lysine, 100-1000; L-methionine, 100-1000; Lphenylalanine, 100-1000; L-threonine, 100-1000; L-tryptophan, 10-1000; L-tyrosine, 30-300; L-valine, 100-1000; lemon balm (*Melissa officinalis*) essential oil, 10-100; magnesium chloride, 10-100; nicotinic acid, 1-10; passionflower (*Passiflora incarnata*) essential oil, 10-100; potassium chloride, 10-500; pyridoxal HCl, 1-10; riboflavin, 1-10; sodium chloride, 100-1000; taurine, 100-1000; and thiamin 1-10.

A beverage may be created. As an example, dissolve 580 mg $CaCl_2.2H_2O$, 1 mg calcium pantothenate, 6 µg biotin, 540 mg citric acid, 10 µg cyanocobalamin, 800 mg D-ribose, 40 µg folic acid, 1 g low DE maltodextrin, 600 mg L-arginine, 320 mg L-histidine, 320 mg L-isoleucine, 1.4 gm L-leucine, 600 mg L-lysine, 120 mg L-methionine, 560 mg L-phenylalanine, 320 mg L-threonine, 100 mg L-tryptophan, 200 mg L-tyrosine, 400 mg L-valine, 33.8 mg $MgCl_2.6H_2O$, 3.2 mg nicotinic acid, 7 mg pyridoxal HCl, 5 mg riboflavin, 400 mg taurine and 7 mg thiamin in 300 ml distilled water and bring to 355 ml. Disperse 100 mg of the gum acacia in this solution by vigorous stirring at high shear for a period of 3 minutes. Add 50 µl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 1.2 g creatine, 210 mg freeze-dried ("instant") black tea and 400 mg L-carnitine are introduced into the solution with gentle shaking immediately before the beverage is consumed, thus preserving the efficacy of the creatine and tea.

A nutritional composition, termed "Code 3," has been created that contains a low DE maltodextrin, creatine, freeze-dried ("instant") black tea, gum acacia, lemon balm (*Melissa officinalis*) essential oil, passionflower (*Passiflora incarnata*) essential oil, magnesium chloride and sodium chloride. In one embodiment, based on a total of 5,340-33,400 parts by weight of the dry substance, the composition includes low DE maltodextrin, 5,000-30,000; creatine, 150-1500; freeze-dried ("instant") black tea, 50-500; gum acacia, 10-100; lemon balm (*Melissa officinalis*) essential oil, 10-100; Passion Flower (*Passiflora incarnata*) essential oil, 10-100; magnesium chloride 10-100; and sodium chloride, 100-1000 parts.

A beverage may be created in which 10.65 g of low DE maltodextrin, 28.6 mg $MgCl_2 \cdot 6H_2O$ and 1.657 g NaCl are dissolved in 300 ml distilled water and brought to 355 ml. Disperse 100 mg of the gum acacia in this solution by vigorous stirring at high shear for a period of 3 minutes. Add 50 μl each of the lemon balm and passionflower essential oils over the course of 30 seconds with vigorous stirring at high shear to create an emulsion, followed by another 3 minutes of vigorous stirring of the emulsion at high shear. Homogenize for 5 minutes in a microfluidizer. Next, 400 mg L-carnitine, 1.2 g creatine and 210 mg freeze-dried ("instant") black tea are introduced with gentle shaking immediately before the beverage is consumed, thus preserving the efficacy of the creatine and tea.

A nutritional composition, termed "Code 4," has been created that contains a low DE maltodextrin, black tea extract, creatine, gum acacia, lemon balm (*Melissa officinalis*) essential oil, PassionFlower (*Passiflora incarnata*) essential oil, magnesium chloride, potassium chloride and sodium chloride. The composition includes, based on a total of 5,200-21,920 parts by weight of the dry substance, low DE maltodextrin, 5,000-20,000; freeze-dried ("instant") black tea, 50-500; gum acacia, 10-100; lemon balm (*Melissa officinalis*) essential oil, 10-100; Passion Flower (*Passiflora incarnata*) essential oil, 10-100; magnesium chloride 10-20; potassium chloride, 10-100; and sodium chloride, 100-1000 parts.

A beverage may be created in which 10.65 g low DE maltodextrin, 28.6 mg $MgCl_2 \cdot 6H_2O$, 62.1 mg $CaCl_2 \cdot 2H_2O$, 52.5 mg KCl and 617 mg NaCl are dissolved in 300 ml distilled water and brought to 355 ml. Disperse 100 mg of the gum acacia in this solution by vigorous stirring at high shear for a period of 3 minutes. Add 50 μl each of the lemon balm and passionflower essential oils to the solution over the course of 30 seconds with vigorous stirring at high shear to create an emulsion, followed by another 3 minutes of vigorous stirring of the emulsion at high shear. Homogenize for 5 minutes in a microfluidizer. Next, 1.2 g creatine, 210 mg freeze-dried ("instant") black tea and 400 mg L-carnitine are introduced with gentle shaking immediately before the beverage is consumed, thus preserving the efficacy of the creatine and tea.

What is claimed is:

1. A method of consuming a set of beverages, comprising the steps of:
    consuming prior to exertion a first formulation, based on a total of 430-4300 parts by weight of the dry substance, of creatine 150-1500, freeze-dried ("instant") black tea 50-500, gum acacia 10-100, L-carnitine 100-1000, lemon balm (*Melissa officinalis*) essential oil, 10-100, passionflower (*Passiflora incarnata*) essential oil 10-100, and taurine 100-1000 parts,
    consuming during exertion a second formulation, based on a total of 5,340-33,400 parts by weight of the dry substance, of low DE maltodextrin, 5,000-30,000, creatine, 150-1500, freeze-dried ("instant") black tea, 50-500, gum acacia, 10-100, lemon balm (*Melissa officinalis*) essential oil, 10-100, Passion Flower (*Passiflora incarnata*) essential oil, 10-100, magnesium chloride 10-100, and sodium chloride, 100-1000 parts; and
    consuming after exertion a third formulation, based on a total of 5,200-21,920 parts by weight of the dry substance, of low DE maltodextrin, 5,000-20,000, freeze-dried ("instant") black tea, 50-500, gum acacia, 10-100, lemon balm (*Melissa officinalis*) essential oil, 10-100, Passion Flower (*Passiflora incarnata*) essential oil, 10-100, magnesium chloride 10-20, potassium chloride, 10-100, and sodium chloride, 100-1000 parts,
    wherein each formulation is dissolved in an aqueous medium.

* * * * *